(12) United States Patent
Steingräber (10) Patent No.: US 12,502,525 B2
(45) Date of Patent: Dec. 23, 2025

(54) PUMP SYSTEM FOR PUMPING A FLUID AND METHOD FOR OPERATING A PUMP SYSTEM

(71) Applicant: Berlin Heart GmbH, Berlin (DE)

(72) Inventor: Robert Steingräber, Berlin (DE)

(73) Assignee: Berlin Heart GmbH, Berlin (DE)

( * ) Notice: Subject to any disclaimer, the term of this patent is extended or adjusted under 35 U.S.C. 154(b) by 243 days.

(21) Appl. No.: 17/268,900

(22) PCT Filed: Aug. 16, 2019

(86) PCT No.: PCT/EP2019/072056
§ 371 (c)(1),
(2) Date: Feb. 16, 2021

(87) PCT Pub. No.: WO2020/035611
PCT Pub. Date: Feb. 20, 2020

(65) Prior Publication Data
US 2022/0111196 A1    Apr. 14, 2022

(30) Foreign Application Priority Data
Aug. 17, 2018    (EP) .................................... 18189536

(51) Int. Cl.
*A61M 60/554*    (2021.01)
*A61M 60/178*    (2021.01)
(Continued)

(52) U.S. Cl.
CPC ........ *A61M 60/894* (2021.01); *A61M 60/178* (2021.01); *A61M 60/268* (2021.01);
(Continued)

(58) Field of Classification Search
CPC .............. A61M 60/894; A61M 60/427; A61M 60/268; A61M 60/554; A61M 60/178; A61M 60/441
See application file for complete search history.

(56) References Cited

U.S. PATENT DOCUMENTS 5,100,374 A    3/1992 Kageyama
5,217,430 A *  6/1993 Mushika .............. A61M 60/538
                                                600/18
(Continued)

FOREIGN PATENT DOCUMENTS

EP    0 659 444 A1    6/1995
EP    1 674 119 A1    6/2006
(Continued)

OTHER PUBLICATIONS

International Search Report for Application No. PCT/EP2019/072056, dated Nov. 13, 2019, 16 pgs.
(Continued)

*Primary Examiner* — Rex R Holmes
*Assistant Examiner* — Jennifer L Ghand
(74) *Attorney, Agent, or Firm* — Crowell & Moring LLP (57) ABSTRACT

A pump system is provided for pumping a fluid and a method is provided for operating the pump system. The pump system comprises a first diaphragm fluid pump, a first inlet cannula connected to the first diaphragm fluid pump for supplying a fluid to the first diaphragm fluid pump, a first outlet cannula connected to the first diaphragm fluid pump for discharging the fluid out of the first diaphragm fluid pump, and a first service pump, which is connected via a first pressure line to the first diaphragm fluid pump and is confirmed to drive the first diaphragm fluid pump via the first pressure line. The pump system further comprises a first inlet flow sensor for detecting a first inlet flow of the fluid in the first inlet cannula and/or a first outlet flow sensor for (Continued)

detecting a first outlet flow of the fluid in the first outlet cannula.

7 Claims, 9 Drawing Sheets

(51) Int. Cl.
*A61M 60/268* (2021.01)
*A61M 60/427* (2021.01)
*A61M 60/441* (2021.01)
*A61M 60/523* (2021.01)
*A61M 60/837* (2021.01)
*A61M 60/859* (2021.01)
*A61M 60/892* (2021.01)
*A61M 60/894* (2021.01)

(52) U.S. Cl.
CPC ........ *A61M 60/427* (2021.01); *A61M 60/441* (2021.01); *A61M 60/523* (2021.01); *A61M 60/554* (2021.01); *A61M 60/837* (2021.01); *A61M 60/859* (2021.01); *A61M 60/892* (2021.01)

(56) References Cited

U.S. PATENT DOCUMENTS

| 2003/0045772 | A1* | 3/2003 | Reich | A61M 60/216 |
| | | | | 600/18 |
| 2008/0177216 | A1 | 7/2008 | Ash | |
| 2009/0270981 | A1* | 10/2009 | Yavorski | A61M 60/554 |
| | | | | 623/3.21 |
| 2011/0004158 | A1* | 1/2011 | Luciano | A61M 27/002 |
| | | | | 604/131 |
| 2013/0280692 | A1* | 10/2013 | Gourlay | A61M 60/585 |
| | | | | 422/46 |
| 2022/0387780 | A1* | 12/2022 | Steingräber | A61M 60/523 |

FOREIGN PATENT DOCUMENTS

| EP | 2 298 370 A1 | 3/2011 |
| WO | WO 2017/137578 A1 | 8/2017 |

OTHER PUBLICATIONS

First Office Action received for China Application No. 201980053744.0 dated Jan. 27, 2024 (English and Chinese languages) (19 pages).

* cited by examiner

PUMP SYSTEM FOR PUMPING A FLUID AND METHOD FOR OPERATING A PUMP SYSTEM

CROSS-REFERENCE TO RELATED APPLICATIONS

This application is a 371 nationalization of international patent application PCT/EP2019/072056 filed Aug. 16, 2019, which claims priority under 35 USC § 119 to European Patent Application EP 18189536.8, filed Aug. 17, 2018. The entire contents of each of the above-identified applications are hereby incorporated by reference.

DETAILED DESCRIPTION

The present invention relates to a pump system for pumping a fluid and a method for operating the pump system. The invention also relates to a ventricular assist device for assisting a human or animal heart.

Pump systems for pumping blood as part of ventricular assist devices are known in the prior art. Such pump systems may be designed for unilateral or bilateral cardiac support. The pump system comprises at least one diaphragm fluid pump connected to an inlet cannula for conducting blood from a ventricle or atrium of a heart or a blood vessel to the diaphragm fluid pump and to an outlet cannula for conducting blood from the diaphragm fluid pump to a blood vessel. Furthermore, the pump system comprises at least one working pump, which is connected to the diaphragm fluid pump via a pressure line and drives the diaphragm fluid pump via the pressure line.

Various pneumatic drives are known as drives for the diaphragm fluid pump. One drive variant provides a piston pump as a working pump, which comprises a pneumatic cylinder with an axially movable working piston therein. The working piston may be moved in such a way that a working chamber, which is in a pressure exchange connection with the pressure line, is alternately reduced and enlarged. The pneumatic cylinder further comprises a balancing valve, via which air may flow into the working chamber from the surrounding environment or may flow out of the working chamber into the surrounding environment. In addition, the pump system has at least one control unit for controlling the movement of the working piston and for controlling the mass of air contained in the working chamber.

The working piston is driven by an electric motor. The control unit controls the electric motor so that the working piston moves back and forth axially inside the pneumatic cylinder. If the working cylinder moves towards the pressure line, the working chamber is reduced and the pressure in the working chamber and in the pressure line is increased. The higher pressure causes the diaphragm of the diaphragm fluid pump to curve toward the outlet cannula, forcing blood from the diaphragm fluid pump through the outlet cannula and into the blood vessel connected to the outlet cannula. Subsequently, the movement of the working cylinder reverses so that the pressure in the working chamber and the pressure line decreases. As a result, the diaphragm of the diaphragm fluid pump now curves toward the pressure line and draws the blood in through the inlet cannula from the heart chamber or atrium or blood vessel into the diaphragm fluid pump.

A second drive variant comprises a negative pressure vessel, a compressor, a positive pressure vessel and a valve, which are connected in sequence in a pneumatic circuit, as a working pump. The valve is connected to the pressure line, so that a negative pressure in the negative pressure vessel and a positive pressure in the positive pressure vessel are alternately transmitted to the pressure line via the valve. The alternating negative and positive pressures are transmitted to the diaphragm of the diaphragm fluid pump via the pressure line, so that the blood is alternately drawn into the diaphragm fluid pump and forced out of the diaphragm fluid pump.

In the event of load changes, there is a risk that the blood chamber of the diaphragm fluid pump is no longer completely filled or emptied, which reduces the mean blood flow. Here, complete filling and emptying refers to a complete movement of the diaphragm to its end positions. At the end of the emptying phase there may be a residual blood volume, and at the end of the filling phase there may be a residual air volume on the air side. Possible consequences of the reduced blood flow may be the formation of thrombi or an insufficient supply for the patient. Theoretically, load changes could be compensated by high pressure reserves. However, high pressures in the pump system lead to a very short flow and may damage the blood. A reduction in blood flow and also high pressures should therefore be avoided in order to prevent insufficient supply, reduce the load on the blood, and prevent stagnation times. Such load changes may occur more frequently, especially when the pump system is used in mobile applications. Therefore, it is the object of the present invention to provide a pump system as well as a ventricular assist system containing such a pump system, which allows monitoring of a flow in the inlet and/or the outlet cannula and also of a filling and emptying degree of the diaphragm fluid pump in each pump cycle. It is a further object of the present invention to provide a method for operating such a pump system.

The pump system according to the invention for pumping a fluid comprises a first diaphragm fluid pump, a first inlet cannula connected to the first diaphragm fluid pump for supplying a fluid to the first diaphragm fluid pump, as well as a first outlet cannula connected to the first diaphragm fluid pump for discharging the fluid out of the first diaphragm fluid pump, and a first working pump, which is connected via a first pressure line to the first diaphragm fluid pump and is set up to drive the first diaphragm fluid pump via the first pressure line. The pump system according to the invention is characterized by a first inlet flow sensor for detecting a first inlet flow of the fluid in the first inlet cannula and/or a first outlet flow sensor for detecting a first outlet flow of the fluid in the first outlet cannula.

By means of the inlet flow sensor or the outlet flow sensor, it is possible with the pump system according to the invention to immediately detect a change in the inlet flow or the outlet flow, in particular a decrease in the inlet or outlet flow, and, if necessary, to readjust the system in such a way that the change to the inlet or outlet flow is compensated. Such inlet or outlet flow changes may be the result of load changes in particular, especially when the pump system is mobile, or when there are changes in the pump system. By means of the inlet or outlet flow sensor, load changes may thus also be identified and, if necessary, compensated. This in turn reduces the risk of thrombus formation and insufficient supply for the patient.

In the following, some terms used in the present description of the invention will first be explained. The term "emptying phase" is used here to refer to the phase of fluid outflow from the diaphragm fluid pump. The term "filling phase", on the other hand, refers to the phase of fluid inflow into the diaphragm fluid pump. The terms "emptying duration" and "filling duration" are understood to mean, accordingly, the duration of the respective phases. The term "relative emptying duration" is understood to mean the duration of the emptying phase relative to the duration of the filling phase. The term "filling duration" may also be understood to mean a relative filling duration, i.e. the duration of the filling phase relative to the duration of the emptying phase. The term "pressure" is understood to mean the instantaneous pressure measured relative to the ambient pressure. The term "mean pressure" is understood to mean the pressure in the working chamber and in the pressure line measured relative to the ambient pressure and averaged over a pump cycle. A "pump cycle" is composed of an emptying phase and a filling phase. Accordingly, the emptying phase and the filling phase represent half a pump cycle each.

The pump system according to the invention is suitable particularly, but not exclusively, for pumping blood. The pump system according to the invention may in particular be part of a ventricular assist system. However, other applications of the pump system according to the invention are also conceivable.

In a preferred further refinement of the pump system according to the invention, the pump system may comprise a control unit for controlling the first working pump based on the detected first inlet flow and/or first outlet flow, in particular to achieve a preset for a detected first inlet and/or outlet flow. Control of the first working pump based on the detected first inlet flow and/or first outlet flow may be understood here in particular as a targeted influencing of control members of the first working pump so that a predetermined first inlet flow and/or first outlet flow is at least approximately achieved. In particular, controlling the first working pump based on the detected first inlet flow and/or first outlet flow may be understood as a closed-loop control to achieve the predetermined first inlet flow and/or first outlet flow.

The control unit may also be set up to determine a preset for the first inlet and/or outlet flow based on the detected first inlet and/or outlet flow and to control the working pump according to this preset. The preset for the first inlet and/or outlet flow may comprise a preset for a time average or time behavior of the first inlet and/or outlet flow.

Furthermore, the control unit may be set up to determine, based on the detected first inlet flow and/or first outlet flow or based on the preset for the first inlet and/or outlet flow, a preset for a mean pressure present in the first pressure line, a preset for a pressure amplitude present in the first pressure line, a preset for a pumping rate of the first working pump, a preset for a relative emptying duration, a preset for a filling duration, a preset for an emptying pressure present in the first pressure line and/or a preset for a filling pressure present in the first pressure line, and to control the first working pump according to the preset for the mean pressure, the preset for the pressure amplitude, the preset for the pumping rate, the preset for the relative emptying duration, the preset for the filling duration, the preset for the emptying pressure and/or the preset for the filling pressure such that a predetermined first inlet and/or outlet flow is substantially achieved.

All pressures within the pump system mentioned above and below may, in particular, be relative pressures, i.e. pressures measured relative to the ambient air pressure. Control of the working pump in accordance with the above presets is understood here to mean, in particular, closed-loop control for achieving the predetermined first inlet flow and/or first outlet flow, wherein the first inlet flow and/or first outlet flow may represent controlled variables and, correspondingly, the mean pressure, the pressure amplitude, the pumping rate, the relative emptying duration, the filling duration, the emptying pressure and/or the filling pressure may represent manipulated variables.

In an advantageous embodiment of the present invention, the working pump may be designed as a piston pump. The working pump may, in particular, comprise a working piston which is movable in an oscillatory manner in a working chamber and a balancing valve for changing a mass of a working fluid in the working chamber and/or a pressure in the working chamber, the working chamber being in a pressure exchange connection with the first pressure line, and the control unit being set up, based on the detected first inlet flow and/or first outlet flow and/or based on the preset for the first inlet and/or outlet flow, to determine a preset for a mean pressure in the working chamber, a preset for a pressure amplitude in the working chamber, a preset for a pumping rate, a preset for a stroke of the working piston, a preset for a force of the working piston, a preset for a relative emptying duration, a preset for a filling duration, a preset for an emptying pressure and/or a preset for a filling pressure in the working chamber, and to control the movement of the working piston and the balancing valve according to the preset for the mean pressure, the preset for the pressure amplitude, the preset for the pumping rate, the preset for the stroke, the preset for the force, the preset for the relative emptying duration, the preset for the filling duration, the preset for the emptying pressure and/or the preset for the filling pressure so that a predetermined first inlet flow and/or first outlet flow is substantially achieved. Controlling the movement of the working piston and the balancing valve in accordance with the above presets is understood here to mean, in particular, closed-loop control for achieving the predetermined first inlet flow and/or first outlet flow, wherein the first inlet flow and/or first outlet flow may represent controlled variables and, correspondingly, the mean pressure, the pressure amplitude, the pumping rate, the stroke, the force, the relative emptying duration, the filling duration, the emptying pressure and/or the filling pressure may represent manipulated variables.

In particular, the force of the working piston may include a load and an inertia of the working piston.

Furthermore, the control unit may be set up to determine a position preset for the working piston based on the preset for the mean pressure, the preset for the pressure amplitude, the preset for the pumping rate, the preset for the stroke, the preset for the force, the preset for the relative emptying duration, the preset for the filling duration, the preset for the emptying pressure and/or the preset for the filling pressure and to control the movement of the working piston in accordance with the position preset and the balancing valve in accordance with the preset for the mean pressure in such a manner that the preset for the mean pressure, the preset for the pressure amplitude, the preset for the pumping rate, the preset for the stroke, the preset for the force, the preset for the relative emptying duration, the preset for the filling duration, the preset for the emptying pressure and/or the preset for the filling pressure is substantially achieved. Controlling the movement of the working piston and the balancing valve in accordance with the above-mentioned presets is understood here to mean, in particular, closed-loop control for achieving the preset for the mean pressure, the preset for the pressure amplitude, the preset for the pumping rate, the preset for the stroke, the preset for the force, the preset for the relative emptying duration, the preset for the filling duration, the preset for the emptying pressure and/or the preset for the filling pressure, these presets being converted into presets for a pressure and position controller.

The position preset may include a preset for the time behavior of the position or a preset for one or both reversal points of the working piston.

Furthermore, the control unit may be set up to determine a pressure preset for the working chamber and a preset for a reversal position of the working piston based on the preset for the mean pressure, the preset for the pressure amplitude, the preset for the pumping rate, the preset for the stroke, the preset for the force, the preset for the relative emptying duration, the preset for the filling duration, the preset for the emptying pressure and/or the preset for the filling pressure and to control the movement of the working piston in accordance with the pressure preset and the balancing valve in accordance with the preset for the reversal position so that the preset for the mean pressure, the preset for the pressure amplitude, the preset for the pumping rate, the preset for the stroke, the preset for the force, the preset for the relative emptying duration, the preset for the filling duration, the preset for the emptying pressure and/or the preset for the filling pressure is substantially achieved. Controlling the movement of the working piston and of the balancing valve in accordance with the above-mentioned presets is understood here to mean, in particular, closed-loop control for achieving the preset for the mean pressure, the preset for the pressure amplitude, the preset for the pumping rate, the preset for the stroke, the preset for the force, the preset for the relative emptying duration, the preset for the filling duration, the preset for the emptying pressure and/or the preset for the filling pressure, these presets being converted into a preset for a pressure controller.

The pressure preset for the working chamber may include a preset for a time behavior of the pressure, a preset for a time-dependent pressure value or a preset for a position-dependent pressure value, in particular a preset for a target pressure in the filling phase and/or a preset for a target pressure in the emptying phase.

According to a further embodiment of the invention, the control unit may comprise at least two control modules, wherein the first control module is set up to determine the preset for the pressure amplitude, the preset for the pumping rate, the preset for the stroke, the preset for the force, the preset for the relative emptying duration, the preset for the filling duration, the preset for the emptying pressure and/or the preset for the filling pressure and to perform an inlet and/or outlet flow control, i.e. to control the working pump according to the aforementioned presets such that the predetermined inlet and/or outlet flow is substantially achieved. The second control module may be set up to determine the position and pressure preset and to perform position and pressure control accordingly, i.e. to control the working pump in accordance with the position and pressure preset such that the preset for the pressure amplitude, the preset for the pumping rate, the preset for the stroke, the preset for the force, the preset for the relative emptying duration, the preset for the filling duration, the preset for the emptying pressure and/or the preset for the filling pressure are substantially achieved. Alternatively, it is also conceivable that the first control module is set up to determine the position and pressure preset instead of the second control module and to forward this to the second control module for position and pressure control.

The working piston may preferably be driven by means of an electric spindle motor.

In a further advantageous embodiment of the invention, the first working pump may comprise a closed pneumatic circuit (hereinafter also referred to as a compressor pump), in which a compressor, a negative pressure vessel, a working pump valve and a positive pressure vessel are arranged in sequence, the working pump valve being controllable in such a way that a negative pressure present in the negative pressure vessel and a positive pressure present in the positive pressure vessel are alternately transmitted to the first pressure line via the working pump valve, and the control unit is set up, based on the detected first inlet flow and/or first outlet flow and/or based on the preset for the first inlet and/or outlet flow, to determine a preset for a mean pressure in the working chamber, a preset for a pressure amplitude in the working chamber, a preset for a pumping rate, a preset for a relative emptying duration, a preset for a filling duration, a preset for an emptying pressure and/or a preset for a filling pressure in the working chamber, and to control the working pump valve according to the preset for the mean pressure, the preset for the pressure amplitude, the preset for the pumping rate, the preset for the relative emptying duration, the preset for the filling duration, the preset for the emptying pressure and/or the preset for the filling pressure such that a predetermined first inlet and/or outlet flow is substantially achieved.

The working pump valve is understood to be, in particular, a 3/2-way valve, which may be, in particular, a continuous valve and/or a proportional valve. A working fluid may flow through the working pump valve during the transmission of the positive pressure and the negative pressure, and a volume flow of the working fluid may be adjusted. Due to an adjustability of the volume flow, the working pump valve enables a finer and more accurate open-loop and closed-loop control of the pressure in the pressure line.

Control of the working pump valve in accordance with the above presets is understood here to mean, in particular, closed-loop control for achieving the predetermined first inlet flow and/or first outlet flow, wherein the first inlet flow and/or first outlet flow may represent controlled variables and, correspondingly, the mean pressure, the pressure amplitude, the pumping rate, the relative emptying duration, the filling duration, the emptying pressure and/or the filling pressure may represent manipulated variables.

Furthermore, the control unit may be set up to determine a pressure preset for the pressure line from the preset for the mean pressure, the preset for the pressure amplitude, the preset for the pumping rate, the preset for the relative emptying duration, the preset for the filling duration, the preset for the emptying pressure and/or the preset for the filling pressure and to control the working pump valve according to the pressure preset in such a way that the preset for the mean pressure, the preset for the pressure amplitude, the preset for the pumping rate, the preset for the relative emptying duration, the preset for the filling duration, the preset for the emptying pressure and/or the preset for the filling pressure is substantially achieved. Control of the working pump valve in accordance with the above-mentioned presets is understood here in particular as closed-loop control for achieving the preset for the mean pressure, the preset for the pressure amplitude, the preset for the pumping rate, the preset for the relative emptying duration, the preset for the filling duration, the preset for the emptying pressure and/or the preset for the filling pressure, wherein the pressure may represent a controlled variable and the mean pressure, the pressure amplitude, the pumping rate, the relative emptying duration, the filling duration, the emptying pressure and the filling pressure may represent manipulated variables.

The pressure preset for the pressure line may include a preset for a time behavior of the pressure, a preset for a time-dependent pressure value or a preset for a position-dependent pressure value, in particular a preset for a target pressure in the filling phase and/or a preset for a target pressure in the emptying phase.

As in the case of the piston pump as a working pump, the control unit for the compressor pump may also comprise at least two control modules, the first control module being set up to determine the preset for the pressure amplitude, the preset for the pumping rate, the preset for the relative emptying duration, the preset for the filling duration, the preset for the emptying pressure and/or the preset for the filling pressure and to carry out inlet and/or outlet flow control, i.e. to control the working pump in accordance with the aforementioned presets such that the predetermined inlet and/or outlet flow is substantially achieved. The second control module may be set up to determine the pressure preset and to perform pressure control, i.e. to control the working pump in accordance with the pressure preset such that the preset for the pressure amplitude, the preset for the pumping rate, the preset for the stroke, the preset for the relative emptying duration, the preset for the filling duration, the preset for the emptying pressure and/or the preset for the filling pressure are substantially achieved. Alternatively, it is also conceivable that the first control module is set up to determine the pressure preset instead of the second control module and to forward this to the second control module for pressure control.

Air in particular may be used as the working medium in the working pump. In this case, in the case of a piston pump as a working pump, a pressure exchange may take place between the working chamber, or, in the case of a pneumatic circuit with a compressor described above, between the negative pressure or positive pressure vessel and the pressure line, together with an air exchange.

The pump system according to the invention may further comprise a second diaphragm fluid pump, a second inlet cannula connected to the second diaphragm fluid pump for supplying the fluid to the second diaphragm fluid pump, and a second outlet cannula connected to the second diaphragm fluid pump for discharging the fluid from the second diaphragm fluid pump, a second working pump, which is connected to the second diaphragm fluid pump via a second pressure line and is set up to drive the second diaphragm fluid pump via the second pressure line, and a second inlet and/or second outlet flow sensor for detecting a second inlet flow in the second inlet cannula and/or a second outlet flow in the second outlet cannula. In this case, the control unit is set up to control the first and/or second working pump based on the detected first and/or second inlet and/or outlet flow.

Further, the pump system may also comprise a control unit having a plurality of subunits, wherein the subunits may communicate with each other. In particular, the control unit may comprise a first subunit set up to control the first working pump based on the detected first and/or second inlet and/or outlet flow, and a second subunit set up to control the second working pump based on the detected first and/or second inlet and/or outlet flow. Each of the subunits may further comprise a first control module described above and a second control module described above.

The first and/or second inlet and/or outlet flow sensor may comprise, in particular, an ultrasonic sensor. The first and/or second inlet and/or outlet flow sensor may comprise an ultrasonic sensor which is set up in particular to measure the inlet and/or outlet flow by means of a transit time method. The inlet and/or outlet flow sensor may further be designed to detect all frequency components of the measured inlet and/or outlet flow. The inlet flow sensor may be arranged on the inlet cannula in such a way that it surrounds the inlet cannula, in particular surrounds it completely. The outlet flow sensor may be arranged on the outlet cannula in such a way that it encloses the outlet cannula, in particular encloses it completely.

The present invention further includes a ventricular assist system comprising a pump system as described above for pumping blood, wherein the first and/or second inlet cannula is fluidically connectable to a ventricle and/or an atrium of a heart and/or a blood vessel—in particular at least one vena cava, preferably a superior vena cava and an inferior vena cava—and the first and/or second outlet cannula is fluidically connectable to a blood vessel.

As mentioned above, the first inlet flow sensor or the first outlet flow sensor of the pump system makes it possible to immediately detect a change in the first inlet flow or the first outlet flow and, if necessary, to readjust the system so that the change in the first inlet or outlet flow is compensated. The advantages of this option are particularly evident in the context of the ventricular assist device.

Patients who benefit from a detection of changes in the first inlet or outlet flow and/or a readjustment of the system to compensate for the change are primarily those with systolic and diastolic heart failure (heart failure patients) and patients with Fontan circulation (Fontan patients). In the latter, the inlet cannula is typically connected to the superior and/or inferior vena cava. In healthy individuals, the autonomic nervous system ensures that cardiac output is adjusted to maintain organ perfusion. In addition, blood pressure and blood volume are regulated by the renin-angiotensin-aldosterone system. On the one hand, there are baroreceptors for setting low pressures. These baroreceptors in the venae cavae, pulmonary arteries, and atria and ventricles signal excessive pressures. The body's response is to increase the heart rate, dilate venous vessels, and increase urine excretion through the kidneys. As a result, the pressures in the area of these baroreceptors decrease. The central relationship between filling pressure or filling volume and cardiac output is known as the Frank-Starling mechanism. In accordance with the Bowditch effect, when the rate increases, the contractility of the heart increases. On the other hand, there are baroreceptors for setting high pressures. They are located in the aortic arch, anterior to the internal cephalic vein and in the subclavian artery. Excessively low pressures at these sites result in an increase in cardiac output and contractility.

In some patients, the heart may be too weak for this response, or it may need to be spared. In the short term, insufficient cardiac support may lead, for example, to respiratory distress, premature exhaustion, and diminished organ perfusion. Fluid overload may also develop, leading to edema, pleural effusions, pulmonary venous congestion with reduced oxygen saturation, and other impairments. For example, increased pressure in the vena cavae in Fontan patients may cause a worsening of liver or kidney function, or organ damage, or deposition of lymphatic fluid in the lungs or peritoneal cavity.

A preset determined by the control unit as described above based on the detected first inlet and/or first outlet flow or based on the preset for the first inlet and/or outlet flow, in particular a preset for the pumping rate of the first working pump and/or the filling duration and/or the relative emptying duration, may help to reduce the symptoms of heart failure or Fontan patients described above.

The invention also comprises a method for operating a pump system as described above, wherein the first and/or second working pump is controlled based on the detected first and/or second inlet and/or outlet flow.

The pump system may be designed as a stationary or mobile system as well as being part of a stationary or mobile ventricular assist device.

The above features of the pump system and the ventricular assist device may also advantageously refine the method for operating the pump system, and vice versa.

In the following, a pump system according to the invention, a ventricular assist device according to the invention, and a method for operating the pump system are described in more detail on the basis of specific embodiment examples and with the use of figures. Different refining elements that are essential to the invention or also advantageous are described here within the framework of a specific example, with individual ones of these elements also being able to be used as such to refine the invention—also removed from the context of the example in question and further features of the example in question. Furthermore, like or similar reference signs are used for like or similar elements, and explanation thereof is therefore omitted to some extent.

Figure 1A:
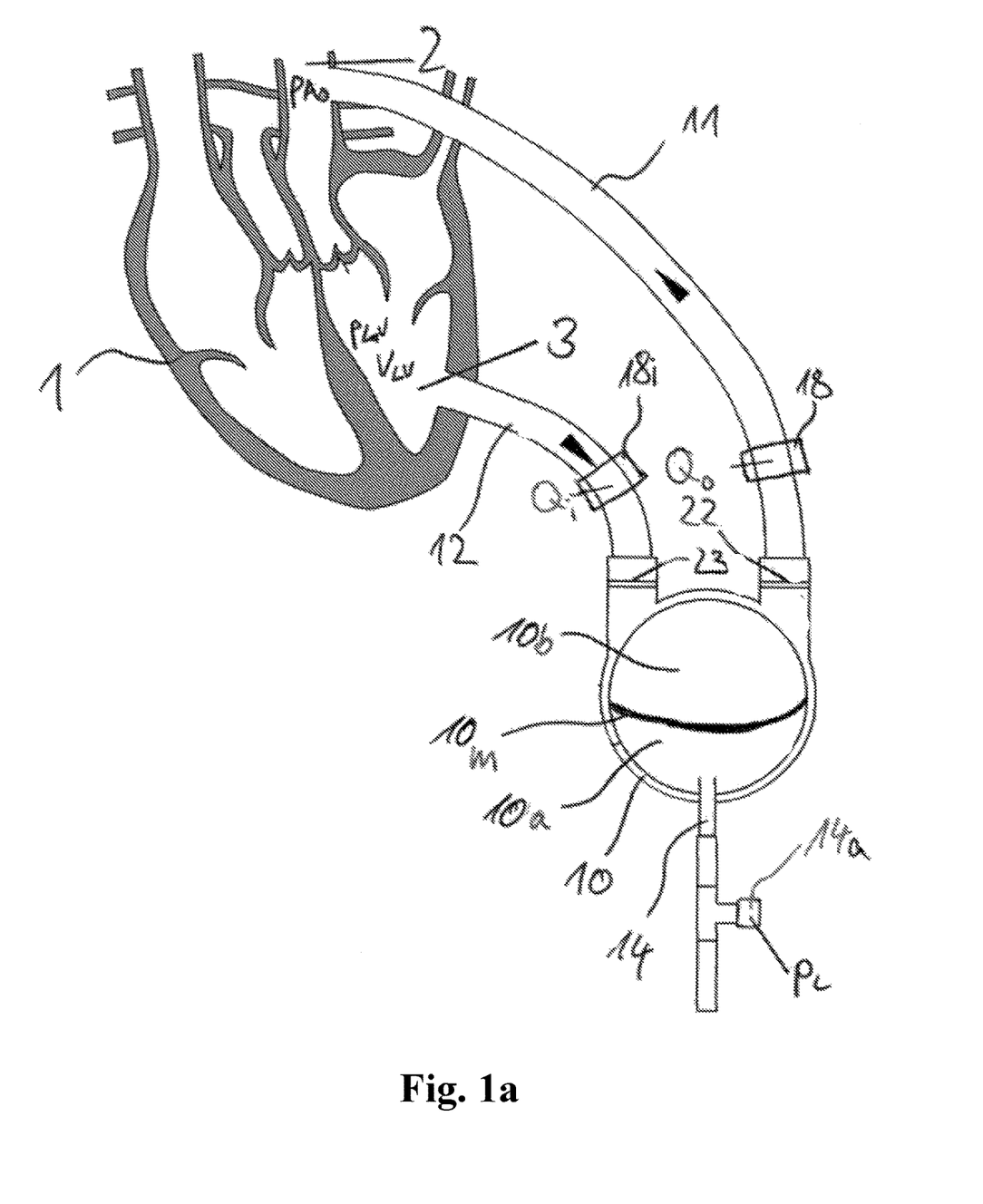
FIG. 1 shows a schematic view of a part of a ventricular assist device according to the invention.
Figure 1B:
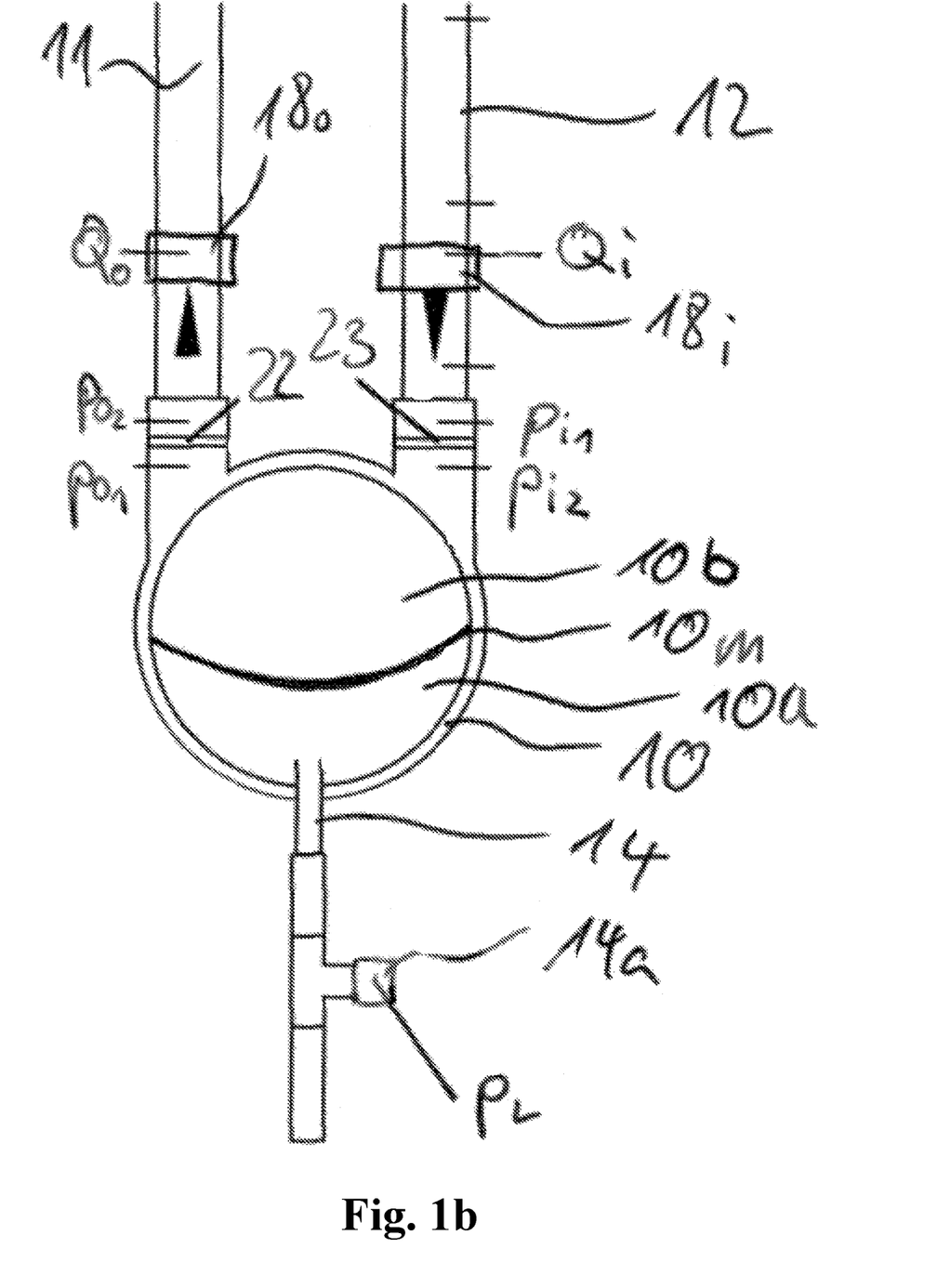
Figure 2:
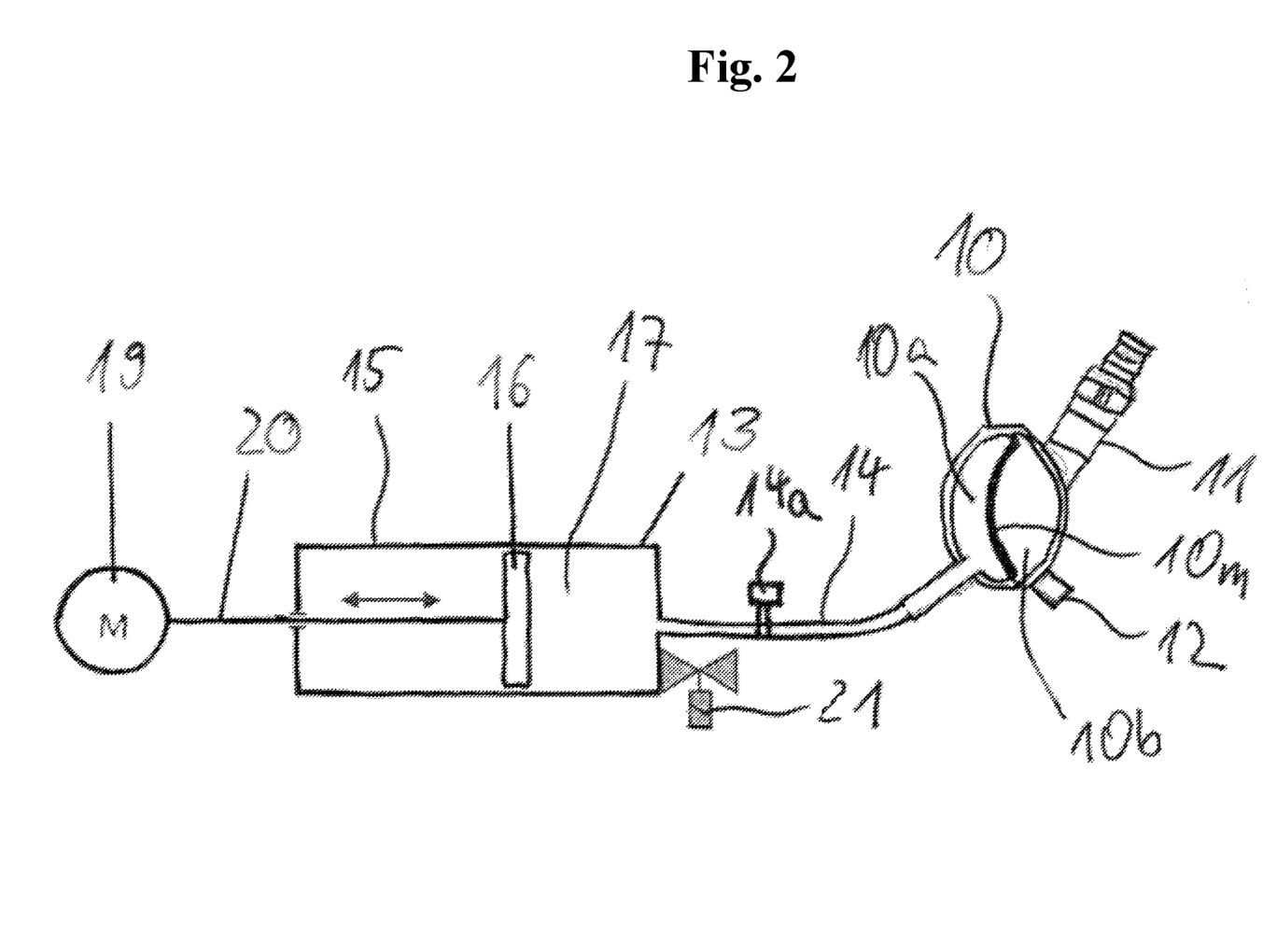
FIG. 2 shows a schematic view of a part of a first embodiment example of a pump system according to the invention.

FIGS. 1 and 2 show schematic views of parts of a ventricular assist device according to the invention.

FIG. 1 shows a part of a ventricular assist device according to the invention. FIG. 1a) shows the ventricular assist device as arranged on a human heart 1. FIG. 1b) shows the ventricular assist device with further details. The ventricular assist device comprises a diaphragm blood pump 10 having a diaphragm 10m which is arranged inside the diaphragm blood pump 10 and which divides the interior of the diaphragm blood pump 10 into an air chamber 10a and a blood chamber 10b. The ventricular assist device further comprises an inlet cannula 12 fluidically connected to the blood chamber 10b, an outlet cannula 11 fluidically connected to the blood chamber 10b, and a pressure line 14 fluidically connected to the air chamber 10a. The blood chamber 10b of the diaphragm blood pump 10 is fluidically connectable to the left ventricle 3 of the heart 1 via the inlet cannula 12 and to an aorta 2 via the outlet cannula 11. Instead of a cardiac chamber, the diaphragm blood pump 10 may also be fluidically connectable, for example, to an atrium of the heart 1 and/or to a blood vessel—in particular at least one vena cava, preferably a superior vena cava and an inferior vena cava—via the inlet cannula 12. Via the pressure line 14, the air chamber 10a of the diaphragm blood pump is fluidically connectable to a working pump, for example a piston pump or a compressor pump (not shown in FIG. 1). A pressure sensor 14a for measuring a pressure present in the pressure line 14 is also arranged in the pressure line 14. At the junction between the diaphragm blood pump 10 and the inlet cannula 12, the diaphragm blood pump 10 has an inlet valve 23. At the junction between the diaphragm blood pump 10 and the outlet cannula 11, the diaphragm blood pump 10 has an outlet valve 22. Furthermore, an inlet flow sensor 18i is arranged on the inlet cannula 12 for measuring an inlet flow Qi. Similarly, an outlet flow sensor 18o is arranged on the outlet cannula 11 for measuring an outlet flow Qo.

FIG. 2 shows a first embodiment example of a pump system according to the invention, which may be used in the ventricular assist device shown in FIG. 1. The pump system comprises a diaphragm blood pump 10 as shown in FIG. 1 and a pressure line 14 fluidically connected to the diaphragm blood pump 10. The pump system further comprises a piston pump 15 as a working pump for driving the diaphragm blood pump 10. The piston pump 15 comprises a hollow-cylindrical housing 13 in which a working piston 16 is movable in an oscillatory manner back and forth along the longitudinal axis of the hollow-cylindrical housing 13. The working piston 16 may be moved here in such a way that a working chamber 17 located in the hollow-cylindrical housing 15 decreases and increases in size in an oscillatory manner. The oscillatory motion of the working piston 16 is imparted by a spindle 20 driven by an electric motor 19 and rotatable both counterclockwise and clockwise. A ball screw may also be used as the spindle 20. A balancing valve 21 is further arranged in a wall of the hollow-cylindrical housing 15, for balancing a quantity of the working medium located in the working chamber 17. Air is used here as the working medium. A pressure sensor 14a is arranged in the pressure line 14. However, this may also be arranged as part of the piston pump 15 in the working chamber 17.

As already shown in FIG. 1, the diaphragm blood pump 10 has a flexible diaphragm 10m that divides the diaphragm blood pump into a blood chamber 10b and an air chamber 10a. The working chamber 17 of the piston pump 15 is in pressure and material exchange connection with the pressure line 14 and the air chamber 10a so that the air may spread between the working piston 16 and the diaphragm 10m. The blood chamber 10b is in pressure exchange connection with the air chamber 10a the pressure line 14, the working chamber 17, and the inlet and outlet cannulas 12 and 11 via the diaphragm 10m, such that pressure in the working chamber 17 may affect the inlet and outlet cannulas 12 and 11. Furthermore, the blood chamber 10b is in material exchange connection with the inlet and outlet cannulas 12 and 11 and the cardiovascular system, so that blood may flow into the blood chamber 10b from the left ventricle 3 via the inlet cannula 12 and out of the blood chamber 10b and into the aorta 2 via the outlet cannula 11, depending on the opening state of the valves 23 and 22.

The following describes the functioning of the pump system according to an embodiment example. The control unit (not shown in the figures) may also specify the control current for the motor 19 to drive the spindle. As a result, the working piston 16 moves and alternately builds up an emptying and a filling pressure $p_L$ with the proviso that the inlet and outlet flows remain constant and the blood chamber 10b fills and empties completely. The emptying pressure and the filling pressure $p_L$ alternately act on the diaphragm 10b, which thereby also alternately builds up a positive and negative pressure $p_O$ and p, in the inlet and outlet cannulas, respectively. In the case of the emptying pressure in the emptying phase, the outlet valve 22 is open and the inlet valve 23 is closed, so that blood is pumped from the blood chamber 10b through the outlet cannula 11 into the aorta 2. Here, the outlet flow sensor 18o measures the outlet flow Qo over the entire emptying duration. Subsequently, a filling pressure is built up in the filling phase, the outlet valve 22 is closed, and the inlet valve 23 is opened, allowing blood to flow from the left ventricle 3 through the inlet cannula 12 into the blood chamber 10b. Here, the inlet flow sensor 18i measures the inlet flow Qi over the entire filling duration. The outlet flow sensor 18o also measures return flow during the filling phase, and the inlet flow sensor measures return flow during the emptying duration phase. The flow measurements of each pump cycle are recorded. Based on the time behavior of the inlet and outlet flow, load changes in the system may then be quickly detected from pump cycle to pump cycle, for example, and quickly compensated by adjusting the mean pressure, pressure amplitude, and/or pumping rate, for example.

Three exemplary experiments illustrating the operating principle of the pump system according to the invention are described below.

Figure 3:
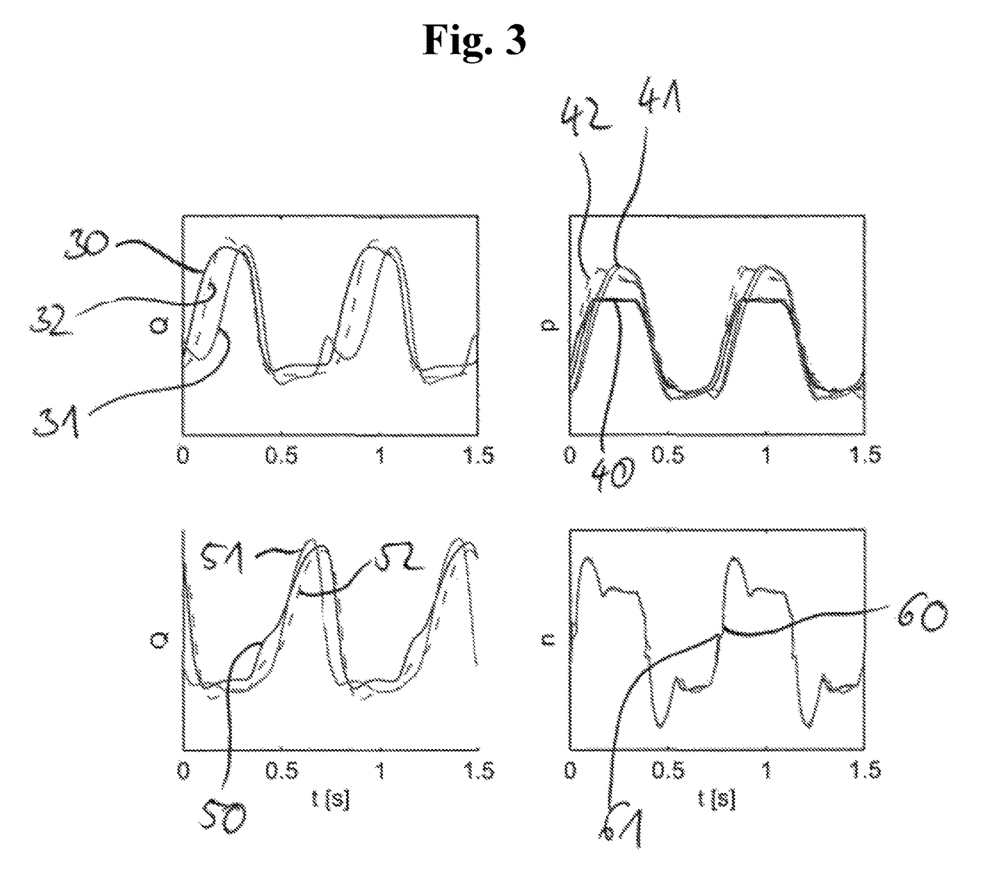
FIG. 3 shows a first experimental example illustrating the operating principle of the pump system according to the invention in accordance with the first embodiment example.

In a first experiment, the pressure $p_{Ao}$ downstream of the outlet cannula 11 was increased so that the pressure $p_O$ generated by the diaphragm 10m experiences a counter pressure, resulting in a decreased pressure difference from the outlet valve 22 to the aorta 2 and thus a decreased blood flow Qo. The result of the first experiment is shown in FIG. 3. The time behavior of the outlet blood flow Qo at the blood flow sensor 18o is shown in the upper left graph. The time behavior of the inlet blood flow Qi at the blood flow sensor 18i is shown in the lower left graph. The time behavior of the pressure prevailing in the working chamber 17 is shown in the top right graph. The time behavior of the speed (i.e. rotation speed) of the spindle 20 is shown in the bottom right graph.

In the pressure graph, curve 40 corresponds to a reference pressure. Reducing the working chamber 17 increases the pressure in the air chamber 10a causing the diaphragm 10m to curve toward the cannulas 11 and 12 when a target emptying pressure is reached. The pressure is now kept constant until the working chamber 17 is enlarged again at the end of the predetermined emptying duration. Thereafter, the pressure in the air chamber 10a drops to the negative range so that a filling pressure builds up and the diaphragm 10m curves toward the pressure line 14 at a corresponding target filling pressure. The filling pressure is now kept constant until the working chamber 17 increases again at the end of the predetermined filling time. Curve 41 corresponds to the time behavior of the pressure with $p_{Ao}$ increase. Curve 42 corresponds to compensation of the increase in $p_{Ao}$ by manual adjustment of the mean pressure in the working chamber and of the stroke of the working piston 16 by adjusting the piston movement and the air volume.

In the outlet flow graph, curve 30 corresponds to a reference flow. This increases in the emptying phase up to a maximum value and decreases again after about half of the emptying duration due to the steady emptying of the blood chamber 10b until the blood chamber 10b is completely emptied at the end of the emptying phase. In the filling phase, the outlet flow is almost zero because the outlet valve 22 is closed. Curve 31 corresponds to the outlet flow at increased $p_{Ao}$. It can be seen that the flow is not greater than zero until later than curve 30, since a higher counter pressure to $p_{Ao}$ must first be generated by the diaphragm 10m in order for the pressure difference between the blood chamber 10b and the outlet cannula 11 to be large enough to open the outlet valve 22. Relatively shortly after reaching the maximum flow, which corresponds approximately to the maximum flow of curve 30, the flow decreases again due to the pressure $p_L$ decreasing towards the end of the emptying phase down to approximately zero in the filling phase, in which the outlet valve 22 is closed. Therefore, it can be seen from the narrower outlet flow curve 31 that complete emptying of the blood chamber 10b does not occur due to the increase in $p_{Ao}$. Curve 32 represents the time behavior of the outlet flow after manual adjustment of the mean pressure and stroke, which roughly corresponds to the reference curve 30.

In the inlet flow graph, curve 50 represents a reference flow and curve 51 represents a time behavior of a flow at increased $p_{Ao}$. Due to the $p_{Ao}$ increase, the diaphragm 10m did not reach its intended end position to completely empty the blood chamber 10b during the previous emptying phase. For this reason, the range of movement of the diaphragm 10m in the filling phase to the intended end position is also smaller. This results in a lower inlet flow, as can be seen from curve 51 compared to curve 50. Curve 52 again corresponds to a time behavior of a flow after manual adjustment of the mean pressure and stroke.

From the speed graph it can be seen that the pressure increase of pAO causes only a very small difference in the time behavior of the speed, since an adjustment of the mean pressure is already sufficient to restore the initial flow. Here, curve 60 corresponds to a reference speed and curve 61 to the speed at pressure increase. The additional stroke increase may be small.

FIG. 3 thus clearly shows that the pressure, which is the usual measurement parameter in the prior art, does not clearly indicate the decline in flow and that it is therefore difficult to counteract this immediately. In the case of the outlet flow measurement, on the other hand, both the mean value of the flow and the time behavior of the flow indicate how much the drive power must be increased in order to maintain the originally set emptying behavior. For example, it can be seen that the emptying pressure must be increased because the outlet flow starts later (and that the filling pressure may be lowered). Furthermore, it is evident from the reduced flow that an adjustment is required. In this case, for example, a controller would simultaneously increase the mean pressure to restore the original symmetry of the flow and increase the piston stroke. Only at a mean pressure that no longer increases the flow would the piston stroke be reduced again, for example.

In the filling phase, the outlet flow measurement also allows the tightness of the outlet valve (return flow) to be detected and how strongly the fluid column in the cannula oscillates at the time the valve opens. An increase in the tendency to vibrate could be an indication of insufficient pressures.

Figure 4:
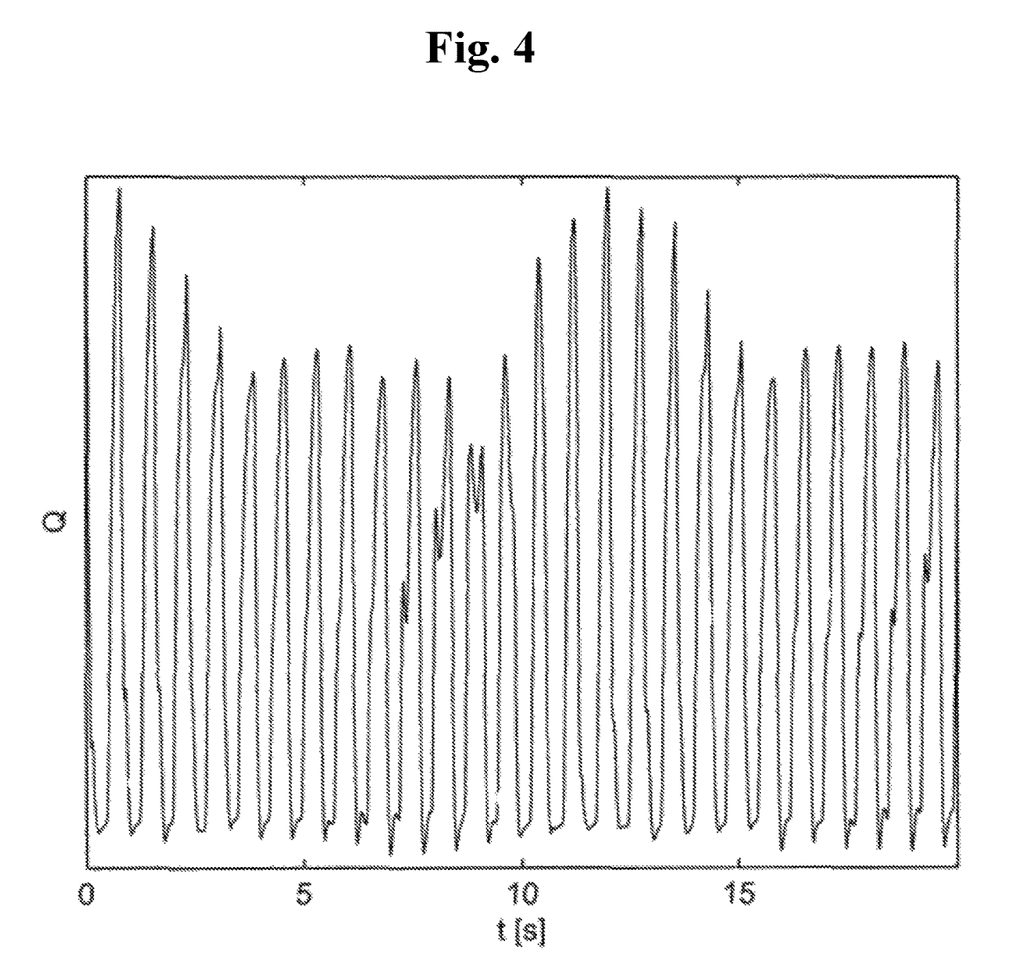
FIG. 4 shows a second experimental example illustrating the operating principle of the pump system according to the invention in accordance with the first embodiment example.

In a second experiment, the pressure $p_{LV}$ (see FIG. 1a)) is changed rectangularly in front of the inlet cannula 12 to simulate pressure fluctuations through the heart 1. The result of the second experiment is shown in FIG. 4. FIG. 4 shows the time behavior of an inlet flow Qi measured with the inlet flow sensor 18i. The rate and amplitude of disruption of $p_{LV}$ may be inferred via the measurement of Qi. It is therefore possible in principle to compensate for this disturbance or to set a fixed ratio of heart rate to pumping rate. Assuming that the heart rate is an indicator of the required blood volume flow in some patients, its target value could be adjusted to the demand.

Figure 5:
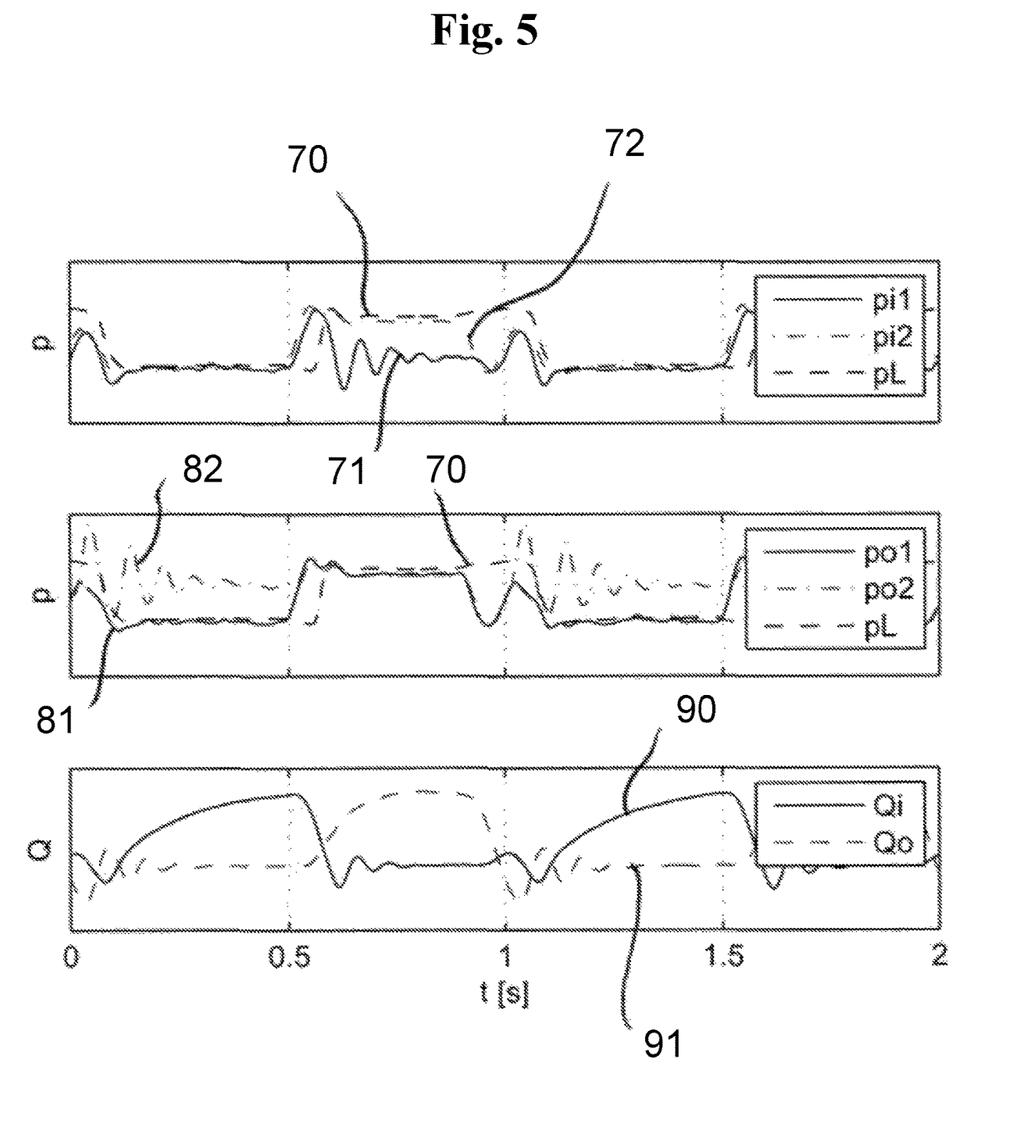
FIG. 5 shows a third experimental example illustrating the mode of operating of the pump system according to the invention in accordance with the first embodiment example.

In a third test, the pressure $p_L$, the inlet flow Qi, the outlet flow Qo and further pressures $p_{i1}$ and $p_{i2}$ upstream and downstream of the inlet valve 23 and further pressures $p_{o1}$ and $p_{o2}$ upstream and downstream of the outlet valve 22 are measured during normal operation. The exact measuring points of the pressures $p_{i1}$, $p_{i2}$, $p_{o1}$ and $p_{o2}$ are shown in FIG. 1b). The results of the third experiment are shown in FIG. 5. Curve 70 describes the time behavior of the pressure $p_L$. Curve 71 describes the time behavior of the pressure $p_{i1}$ upstream of the inlet valve 23. Curve 72 describes the time behavior of the pressure $p_{i2}$ downstream of the inlet valve 23. Curve 81 describes the time behavior of the pressure poi upstream of the outlet valve 22. Curve 82 describes the time behavior of the pressure $p_{o2}$ downstream of the outlet valve 22. Curve 90 describes the time behavior of the inlet flow Qi and curve 91 describes the time behavior of the outlet flow Qo. Here, it is particularly beneficial that the pressure conditions in the diaphragm blood pump 10 and the valve closing behavior of the inlet valve 23 and of the outlet valve 22 cannot be observed with the pressure measurement of $p_L$. The processes are better visible in the time profile of the blood flow.

Figure 6:
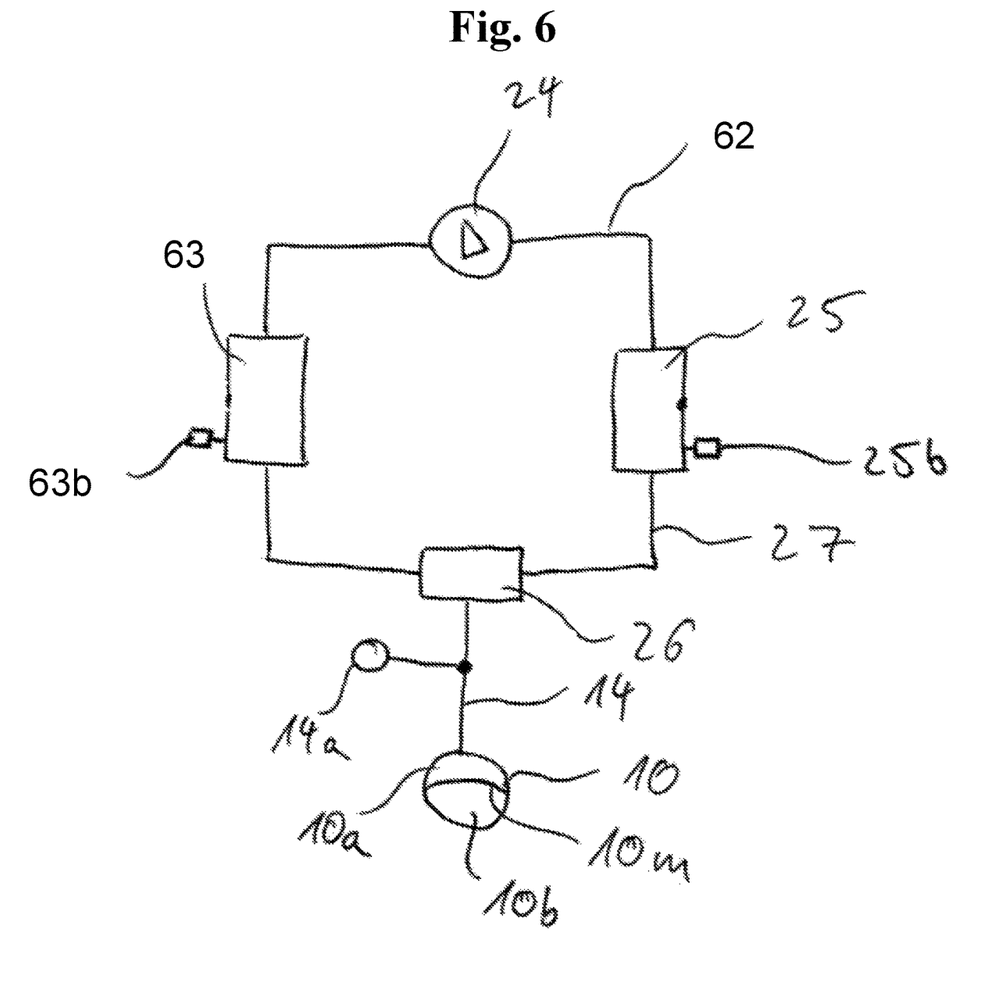
FIG. 6 shows a schematic view of a part of a second embodiment example of a pump system according to the invention.

FIG. 6 shows a schematic view of a part of a second embodiment example of a pump system according to the invention, wherein only components essential for the present invention are shown. The pump system in FIG. 6 has a compressor pump as the working pump. The compressor pump comprises a negative pressure vessel 63, a compressor 24, a positive pressure vessel 25, and a proportional valve 26 as a working pump valve, which are connected in sequence within a closed pneumatic circuit 62 via a first pressure line 27. Furthermore, the proportional valve 26 is fluidically connected to a second pressure line 14. The pressure line 14 is further fluidically connected to a diaphragm blood pump 10, wherein the diaphragm blood pump 10 has a diaphragm 10m that divides an interior of the diaphragm blood pump 10 into an air chamber 10a connected to the second pressure line 14 and a blood chamber 10b located on a side of the diaphragm 10m opposite the air chamber 10a. The blood chamber 10b is connected to an inlet cannula 12 and an outlet cannula 11, as shown in FIG. 1. Furthermore, an inlet flow sensor 18i for detecting an inlet flow Qi is arranged on the inlet cannula 11 and an outlet flow sensor 18o for detecting an outlet flow Qo is arranged on the outlet cannula 11. The inlet and outlet cannulas 12 and 11 and the inlet and outlet flow sensors 18i and 18o are not shown in FIG. 6. A pressure sensor 14a is arranged in the pressure line 14. However, this may also be designed as a component of the compressor pump.

The operating principle of the compressor pump is described below. The compressor 24 generates positive pressure in the positive pressure vessel 25 and a negative pressure in the negative pressure vessel 23. With the aid of valves 25b in the positive pressure vessel and 63b in the negative pressure vessel, the positive pressure in the positive pressure vessel 25 and the negative pressure in the negative pressure vessel 63 may be controlled to the predetermined pressure values. Depending on the opening state, the proportional valve is set up to transmit the negative pressure present in the negative pressure reservoir 23 or the positive pressure present in the positive pressure reservoir 25 to the second pressure line 14. The volume of air flowing through the proportional valve, i.e. the volume of air flowing through the proportional valve within a certain period of time, may be adjusted. The alternating transfer of the positive pressure applied in the positive pressure vessel 25 and the negative pressure applied in the negative pressure vessel results in an alternating emptying pressure and a filling pressure in the second pressure line 14. The emptying pressure and the filling pressure are transmitted via the air chamber 10a of the diaphragm blood pump 10 to the diaphragm 10m of the diaphragm blood pump 10, which forces blood out of the blood chamber 10b into the outlet cannula 11 when the emptying pressure is applied or draws blood into the blood chamber 10b from the inlet cannula 12 when the filling pressure is applied. As blood flows through inlet and outlet cannulas 12 and 11, the flow of blood may be sensed and, at predetermined intervals, the compressor pump may be controlled based on the sensed flows.

The main control objectives in the operation of the pumping system are:
- The diaphragm blood pump must be completely emptied and filled. Here, complete filling and emptying refers to a complete movement of the diaphragm to its end positions. At the end of the emptying phase there may be a residual blood volume, and at the end of the filling phase there may be a residual air volume on the air side.
- A decline in flow that is not actively initiated should be immediately alerted and compensated.
- The ventricle or atrium should not be emptied too much so as not to suck in the heart wall.
- The filling and emptying pressures should be low.
- In the case of operation with two diaphragm blood pumps (biventricular operation), the blood flow of the right diaphragm blood pump should not be greater than that on the left side in order to avoid lung damage.
- All hardware limits (for example, for piston pump: speed, current, travel, etc.) are to be observed.
- Patient- and system-related variances should be compensated in biventricular operation.

These objectives may be better achieved with the help of the flow measurement and control. An overview of the most important flow control variants is given in FIG. 7 for a piston pump according to FIG. 2 and FIG. 8 for a compressor pump according to FIG. 6, both for the case of a diaphragm blood pump and two diaphragm blood pumps.

Figure 7:
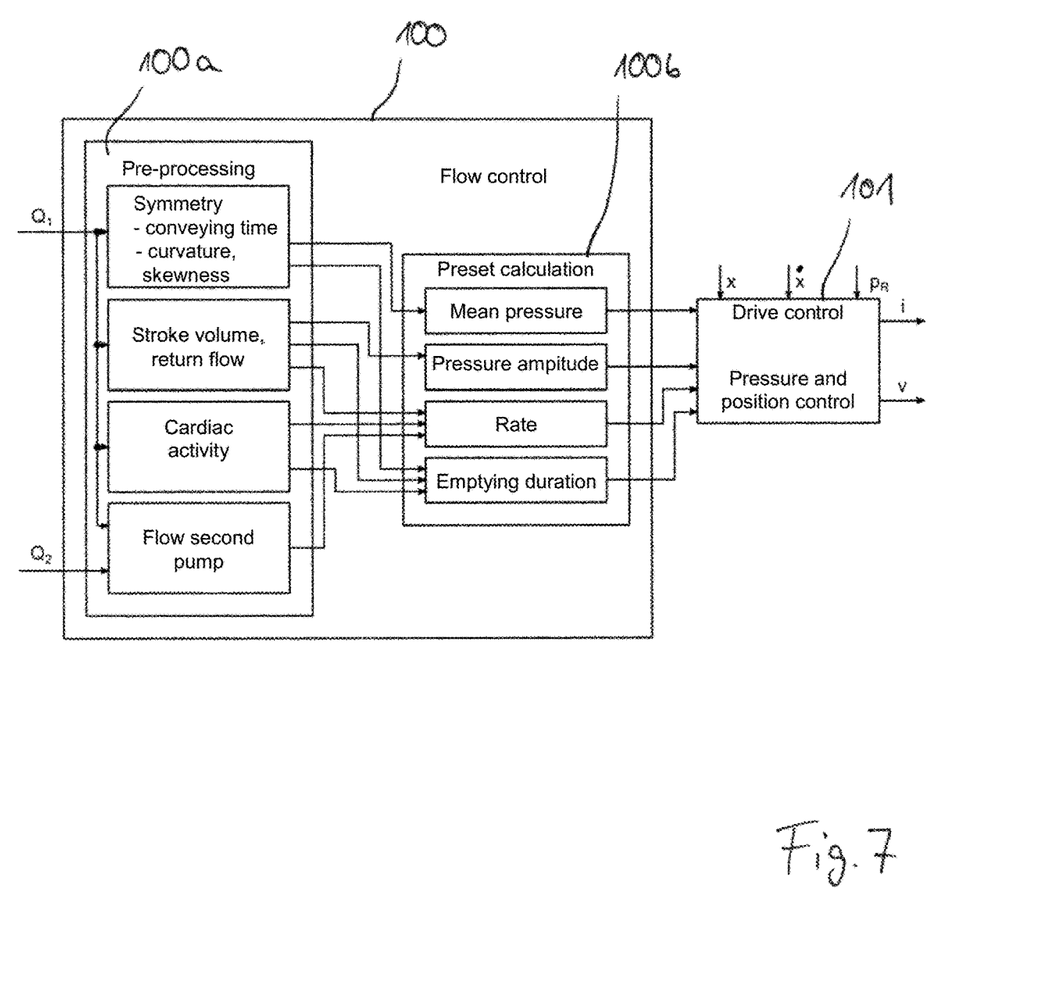
FIG. 7 shows a schematic overview of a processing according to the invention by a control unit according to the invention in accordance with the first embodiment example.

First, the flow control for the piston pump is described using FIG. 7. The piston pump is controlled by means of a control unit. The control unit comprises a first control module 100, which performs the flow control, and a second control module 101, which performs the drive control. In the first control module 100, a pre-processing of the flow measurement values is first performed in the pre-processing unit 100a.

Here, features of the flows, such as symmetry (conveying time, curvature, skewness), pump volume, return flow, cardiac activity, flow ratio, and flow difference of Q1 and Q2 are extracted from the measured values Q1 and Q2 of the flows of two blood pumps in one cannula each. In the preset calculation unit 100b, presets for, for example, the mean pressure, pressure amplitude, rate, and emptying duration are calculated from these extracted features. The calculated presets are then transmitted to the second control module 101 for drive control. In the second control module 101, presets for the piston position control and the pressure control are calculated from the presets of the preset calculation unit 100b and taking into account the position and speed of the working piston 16 and the pressure in the working chamber 17, and a control current i for the spindle motor 19 and a valve opening preset v for the balancing valve 13 are determined therefrom.

As an alternative to the control structure shown in FIG. 7, it is also conceivable that the pressure and position presets are also calculated in the first control module 100.

Figure 8:
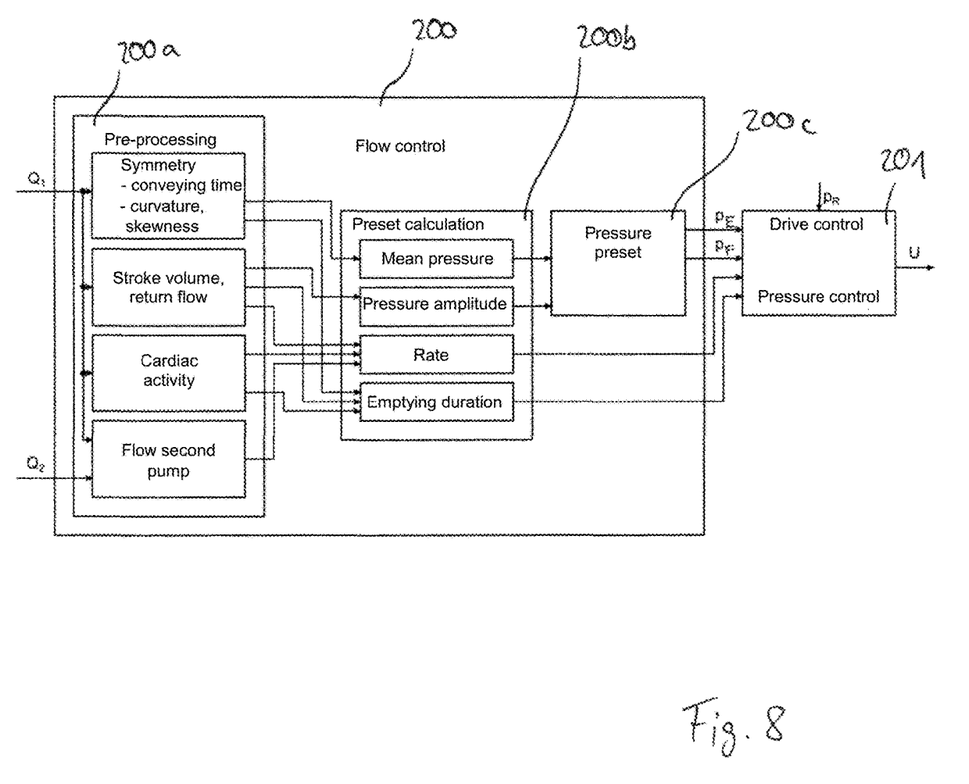
FIG. 8 shows a schematic overview of a processing according to the invention by a control unit according to the invention in accordance with the second embodiment example.

FIG. 8 shows a flow control structure in the case of the compressor pump. The compressor pump is controlled by means of a control unit. The control unit comprises a first control module 200, which performs the flow control, and a second control module 201, which performs the drive control. Here, in a pre-processing unit 200a as in the case of the piston pump, features of the flows, such as symmetry (conveying time, curvature, skewness), pump volume, return flow, cardiac activity, flow ratio, and flow difference of Q1 and Q2, are extracted from the measured values Q1 and Q2 of the flows of two diaphragm blood pumps in one cannula each. In a first preset calculation unit 200b, presets for, for example, the mean pressure, pressure amplitude, rate, and emptying duration are calculated from these extracted features. The calculated presets are then used to calculate pressure presets for an emptying pressure and a filling pressure in a second preset calculation unit 200c. These pressure presets are transmitted to the second control module 201. In the second control module 201, a control voltage for the proportional valve 26 is calculated from the pressure presets for the emptying pressure and the filling pressure, and taking into account the pressure in the second pressure line 14.

As an alternative to the control structure shown in FIG. 8, it is also conceivable that the pressure presets are calculated in the second control module 201 for the drive control. In this case, a second preset calculation unit 200c in the first control module 200 may be omitted.

Specifically, the control objectives may be achieved with the following measures:

Pre-Processing

Symmetry—A symmetry value S is determined from the time behavior of the measured flow. This either indicates the temporal shift of the peak flow for the measurement of the flow in a cannula compared to a reference flow determined when setting, or compares the symmetry of the temporal flow curves for two cannulas. In both cases, the symmetry value could be used to set the mean pressure so that the diaphragm movement corresponds to the reference movement when setting. For the calculation of the symmetry value, other features such as the curvature and the skewness may be used in addition to the shift of the temporal center.

Pump volume and return flow—The pump volume and the return flow volume may also be determined from the flow curve. For this purpose, a phase with open inlet/outlet valve and a phase with closed inlet/outlet valve must be distinguished. The return flow volume is the product of the duration of a pump cycle and the flow averaged over the phase with the inlet/outlet valve closed. The pump volume is the time integral of the flow over the phase with the inlet/outlet valve open. The pump volume may be used to determine the required pressure amplitude, and the return flow volume may be used to adjust the rate. If the pump volume does not respond to increased pressure amplitudes, the rate may also be adjusted. It is also conceivable to adjust the emptying duration to keep the pump volume constant.

Cardiac activity—When evaluating the flow for cardiac activity, two features are particularly important and easy to recognize: The amplitude and the rate. The rate may be used in the form of a rate ratio to adjust the drive rate. The amplitude of the flow disturbance may be used to keep the pressure amplitude as small as possible and as large as necessary.

Comparison with flow of a second diaphragm blood pump—When comparing with the other diaphragm blood pump, either the flow difference or the flow ratio of both sides may be determined in biventricular pump operation. These variables may then be kept constant by rate adjustments.

Outer control loops—Thus, for the outer control loop, there are at least the following parts:

Mean pressure control—The mean pressure controller first calculates the deviation $e=S_R-S$ from a reference for the symmetry value $S_R$, which is determined when setting the drive, and S from the last pump cycles. It then adjusts the mean pressure in each pump cycle in order to reduce e.

Pressure Amplitude—The pressure amplitude controller includes an adjustment for pump volume and/or an adjustment for cardiac activity. The adjustment for the pump volume is carried out analogously to the mean pressure control with the aid of a reference determined when setting. The adjustment for the cardiac activity may consist of an increase in pressure amplitude as the amplitude of the flow variation increases, or it may be dynamic. When the ejection phase of the heart coincides with the filling phase of the diaphragm blood pump, the pressure amplitude is lowered. A few pump cycles later, when both phases are offset, the pressure is increased again. For the latter control, the filling pressure is also suitable as a manipulated variable instead of the pressure amplitude, since an adjustment of the emptying phase is hardly necessary.

Rate controller—The rate adjustment should compensate the return flow, follow the patient's heart rate, and ensure that the right diaphragm blood pump always provides less support in biventricular mode than the diaphragm blood pump connected to the left side of the heart.

Internal control loop—In the case of a piston pump as a working pump, pressure and/or position control may be used for the internal control loop. In the case of the compressor pump, a pressure control may be used for the internal control loop. A pressure control is advantageous because the presets of the external controllers may be implemented more quickly here. This theoretically increases the speed and stability reserves of the processes. An example of a very fast controller is the holding of a pressure until a certain pump volume is reached or until the flow has decreased to a limit. Here, the rate and emptying duration adjustment would occur within one pump cycle and the next pump cycle could respond with a pressure adjustment.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A ventricular assist device for continuously assisting a heart of a patient with heart failure and/or Fontan circulation and maintaining organ perfusion, the ventricular assist device comprising a pump system for pumping a fluid, the pump system comprising:
   a first diaphragm fluid pump;
   a first inlet cannula connected to the first diaphragm fluid pump for supplying a fluid to the first diaphragm fluid pump;
   a first outlet cannula connected to the first diaphragm fluid pump for discharging the fluid out of the first diaphragm fluid pump;
   a first working pump, which is connected via a first pressure line to the first diaphragm fluid pump and is configured to drive the first diaphragm fluid pump via the first pressure line;
   a first inlet flow sensor for detecting a first inlet flow of the fluid in the first inlet cannula and/or a first outlet flow sensor for detecting a first outlet flow of the fluid in the first outlet cannula; and
   a control unit configured to control the first working pump based on the detected first inlet and/or outlet flow as a closed-loop control in order to achieve a preset for the first inlet and/or outlet flow, wherein the preset for the first inlet and/or outlet flow comprises a preset for a time average or a time behavior of the first inlet and/or outlet flow;
   wherein the first working pump has a working piston movable in an oscillatory manner in a working chamber and a balancing valve for changing a mass of a working fluid in the working chamber and/or a pressure in the working chamber, the working chamber being in a pressure exchange connection with the first pressure line, and
   wherein the control unit is configured, based on the detected first inlet flow and/or first outlet flow, to determine a preset for one or more of a mean pressure in the working chamber, a preset for a pressure amplitude in the working chamber, a preset for a pumping rate, a preset for a stroke of the working piston, a preset for a force of the working piston, a preset for a relative emptying duration, a preset for a filling duration, a preset for an emptying pressure, and a preset for a filling pressure in the working chamber, and to control movement of the working piston and the balancing valve according to the preset for the one or more of the mean pressure, the preset for the pressure amplitude, the preset for the pumping rate, the preset for the stroke, the preset for the force, the preset for the relative emptying duration, the preset for the filling duration, the preset for the emptying pressure, and the preset for the filling pressure so that a predetermined first inlet flow and/or first outlet flow is achieved.

2. The ventricular assist device of claim 1, wherein the control unit is configured to determine a position preset for the working piston based on the preset for the one or more of the mean pressure, the preset for the pressure amplitude, the preset for the pumping rate, the preset for the stroke, the preset for the force, the preset for the relative emptying duration, the preset for the filling duration, the preset for the emptying pressure, and the preset for the filling pressure and to control movement of the working piston in accordance with the position preset and to control the balancing valve in accordance with the preset for the mean pressure in such a manner that the preset for the one or more of the mean pressure, the preset for the pressure amplitude, the preset for the pumping rate, the preset for the stroke, the preset for the force, the preset for the relative emptying duration, the preset for the filling duration, the preset for the emptying pressure, and the preset for the filling pressure is achieved.

3. The ventricular assist device of claim 1, wherein the control unit is configured to determine a pressure preset for the working chamber and a preset for a reversal position of the working piston based on the preset for the one or more of the mean pressure, the preset for the pressure amplitude, the preset for the pumping rate, the preset for the stroke, the preset for the force, the preset for the relative emptying duration, the preset for the filling duration, the preset for the emptying pressure, and the preset for the filling pressure and to control movement of the working piston in accordance with the pressure preset and to control the balancing valve in accordance with the preset for the reversal position in such a manner that the preset for the one or more of the mean pressure, the preset for the pressure amplitude, the preset for the pumping rate, the preset for the stroke, the preset for the force, the preset for the relative emptying duration, the preset for the filling duration, the preset for the emptying pressure, and the preset for the filling pressure is achieved.

4. The ventricular assist device of claim 1, wherein the working piston is drivable by an electric spindle motor.

5. The ventricular assist device of claim 1, further comprising:
   a second diaphragm fluid pump;
   a second inlet cannula connected to the second diaphragm fluid pump for supplying the fluid to the second diaphragm fluid pump, as well as a second outlet cannula connected to the second diaphragm fluid pump for discharging the fluid out of the second diaphragm fluid pump;
   a second working pump, which is connected via a second pressure line to the second diaphragm fluid pump and is configured to drive the second diaphragm fluid pump via the second pressure line; and
   a second inlet and/or second outlet flow sensor configured to detect a second inlet flow in the second inlet cannula and/or a second outlet flow in the second outlet cannula,
   the control unit configured to control the first and/or second working pump based on the detected first and/or second inlet and/or outlet flow.

6. The ventricular assist device of claim 5, wherein the first and/or second inlet and/or outlet flow sensor comprises an ultrasonic sensor.

7. The ventricular assist device of claim 5, wherein the first and/or second inlet cannula is fluidically connectable to a ventricle and/or an atrium of a heart and/or a blood vessel and the first and/or second outlet cannula is fluidically connectable to a blood vessel.

* * * * *